A. WESTCOTT.
Churn.
No. 34,082.
Patented Jan. 7, 1862.
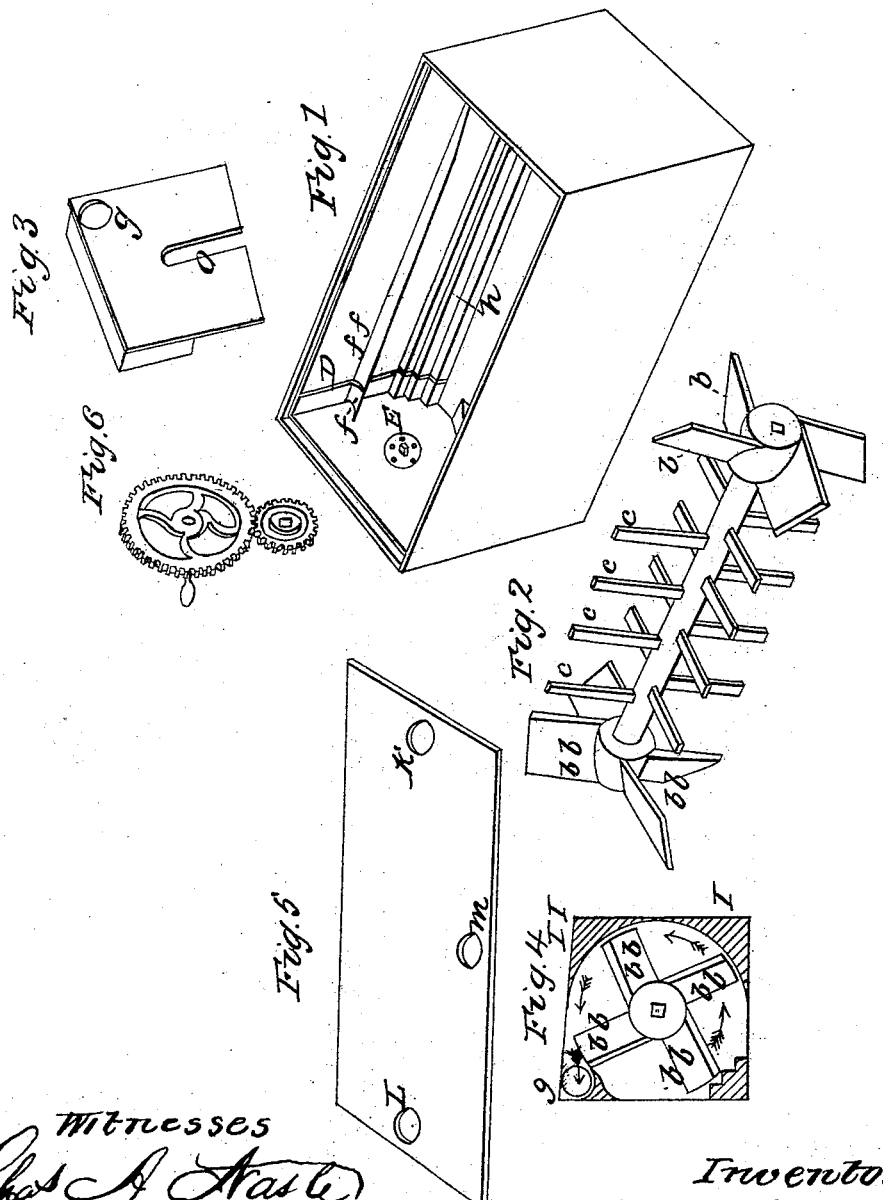

UNITED STATES PATENT OFFICE.

AMOS WESTCOTT, OF SYRACUSE, NEW YORK.

IMPROVEMENT IN CHURNS.

Specification forming part of Letters Patent No. 34,082, dated January 7, 1862.

*To all whom it may concern:*

Be it known that I, AMOS WESTCOTT, of the city of Syracuse, county of Onondaga, and State of New York, have invented a new and useful Improvement in Churns for the Purpose of Churning Cream or Milk, of which the following is a full description, reference being had to the accompanying drawings, which constitute a part of this specification.

My invention consists, essentially, in addition to ordinary floats or dashers used in box-churns, of appliances to secure a perfect interchange of the fluid from end to end of the box and to gather the butter to the center of the churn after it is separated, so as to more perfectly work it, and at the same time to force through the fluid, whether milk or cream, while in the form of spray, a current of atmospheric air.

This churn, including my invention, consists, essentially, of an oblong box, Figure 1.

Fig. 5 is a cover to the box.

$h$, Fig. 1, represents breakers or steps, the opposite corner having the same.

$fff$ is a shallow trough attached to the side of the box near its upper edge. This trough shallows from diaphragm end of the box to the opposite end.

Fig. 2 is a shaft to which common dasher-paddles $c\ c\ c\ c$ of a half-inch width, more or less, are set perpendicularly to the shaft. To each end of this shaft are attached floats $b$ and $b\ b$, set diagonally at an angle with the shaft from thirty or forty degrees. These floats are two inches in width, more or less, and the float-wheels at either end of the shaft are set at opposite angles with each other.

Fig. 6 indicates gear-wheels attached to box at E, the arbor at E entering a square hole in shaft at $a$, when said shaft is put in place and there secured.

Fig. 4 is a chamber, formed when diaphragm, Fig. 3, is in place at D; there being a groove at D—also one opposite, admitting the free passage of the diaphragm—this chamber to be of the same width as float $b\ b$, so that the said float fits closely, at the same time freely allowing the float-wheel to revolve. The angles of this chamber I II are fitted in, as shown in Fig. 4, forming a circle corresponding accurately to the diameter of the float-wheel $b\ b$. The upper segment I I is attached to the diaphragm and is removed with it to facilitate the introduction of the shaft and its attachments into the box. K, L, and M are holes in cover.

$g$, Figs. 3 and 4, is a hole abutting on trough $f$ and $ff$ at D.

Fig. 3, O is a slot of the same width as diameter of shaft, so as freely to admit passage of diaphragm to place. The slot O with hole $g$ are the only openings to the chamber, Fig. 4. The arrows show the direction the shaft with its attachments are to revolve.

The manner of operating this churn is as follows: On sufficient milk or cream being put into the box to form a churning the gear-wheels, Fig. 6, are put in motion, which causes shaft, Fig. 2, with its attachments to revolve rapidly, thus causing the fluid to be dashed and broken into spray. At the same time a current of atmospheric air is forced through this broken fluid. In this manner (the diaphragm being removed during this stage of the operation) the floats $b$ and $b\ b$, owing to their form, act like fans, causing the air to enter at holes K and L, and forcing it through the spray and out at hole M in cover. They also cause the fluid to flow from end to center, thus keeping up a continual current. When diaphragm, Fig. 3, is put in place, thereby forming the chamber, Fig. 4, the fluid passes into chamber through slot O, and then is forced by the rotation of float-wheel $b\ b$ in the direction the arrows show, thence out of the hole $g$ into trough $fff$, along which it flows. This trough is not intended to be of sufficient capacity to carry all the fluid that will be discharged into it. Consequently the fluid will flow over its edge through its entire length, and while falling this fluid will receive the blow of the dasher-paddles, which is more effectual than the mere plunging action of these paddles into an unbroken mass of fluids. When the churn is thus used, the center hole M in the cover is to be closed. When thus closed and the diaphragm is used, the air will enter hole K, and then pass through the length of the box out of hole L.

What I claim as my invention, and desire to secure by Letters Patent, is—

1. The employment of the diagonal float-wheels *b* and *b b*, in combination with the shaft and dasher-paddles *c c c c*, constructed essentially as and for the purpose above described.

2. The combination of the diagonal float-wheel *b b* with the diaphragm, Fig. 3, and chamber, Fig. 4, constructed as and for the purpose above described.

3. The trough *f* and *f f*, in combination with the chamber, diagonal float-wheels, and dasher-paddles, above described.

In testimony whereof I hereunto subscribe my name.

AMOS WESTCOTT.

Witnesses:
 N. T. MOULTON,
 J. H. POMEROY.